United States Patent [19]

Pritz

[11] 4,102,323
[45] Jul. 25, 1978

[54] HEATER FOR BUTTER AND THE LIKE

[76] Inventor: Peter G. Pritz, c/o Trico Non Ferrous Metal Products, Inc., Wyandotte Rd., Willow Grove, Pa. 19090

[21] Appl. No.: 859,691

[22] Filed: Dec. 12, 1977

[51] Int. Cl.² ............................................. A47G 23/04
[52] U.S. Cl. .................................. 126/261; 126/260; 431/290
[58] Field of Search .................... 126/260, 261, 43, 44; 431/290

[56] References Cited

U.S. PATENT DOCUMENTS

| 821,406 | 5/1906 | Ernst | 126/43 |
| 3,144,015 | 8/1964 | Jankowski | 126/261 |

FOREIGN PATENT DOCUMENTS

| 397,497 | 12/1908 | France | 431/290 |
| 20,044 of | 1892 | United Kingdom | 431/290 |

*Primary Examiner*—Edward G. Favors
*Attorney, Agent, or Firm*—Zachary T. Wobensmith, 2nd; Zachary T. Wobensmith, III

[57] ABSTRACT

A heater for butter and the like is disclosed, which includes a tubular cylindrical housing, preferably of sheet metal, flared at the upper end for retention of a cup-shaped receptacle whose contents are to be heated. The housing is elevated on and supported by a plurality of strips the lower ends of which extend downwardly and outwardly and provide legs, and the upper ends of which extend upwardly and outwardly and provide handles. A plurality of openings are provided in the wall of the housing for access of air to the interior. A vertically movable heater support is provided in the interior of the housing having a base portion and an upright arm with a threaded stud extending outwardly through aligned slots in one of the strips and in the housing wall with a nut accessible on the exterior for locking the base portion at the desired adjusted position of elevation. The base portion supports a cup, preferably of metal, for a candle employed for supplying heat.

5 Claims, 5 Drawing Figures

HEATER FOR BUTTER AND THE LIKE

BACKGROUND OF THE INVENTION

1. Field of the Invention

This invention relates to heater for butter and the like.

2. Brief Description of the Prior Art

It has heretofore been proposed as shown in U.S. Pat. No. 3,144,015, to Jankowski, to provide a bracer and support for a flat pie plate with a central cylindrical threaded portion for retention in a threaded bore at the top end of the base portion, and to provide, as shown in FIGS. 3 and 4, a fixed support for a candle in the interior of the base. The rate of combustion is intended to be controlled by variation in alignment of openings at the top, the openings in closed position serving to extinguish the candle.

Torgerson, in U.S. Pat. No. 1,828,628, shows a baby bottle steam heater in which the bottle is supported in a insulated water receptacle having a top closure separable for access to the interior. The receptable is supported on legs which carry a fixed shelf 16 on which a heat source or burner, preferably a can of inflammable material, is supported.

Kobler, in U.S. Pat. No. 2,590,418, shows a plate warmer for a plurality of stacks of plates, a candle being provided for each stack and being capable of vertical height adjustment by turning a turn button to actuate a bar and candle supporting sockets.

Rickenbacher, in U.S. Pat. No. 2,371,410, shows a heating device in which a candle is employed carried at a fixed location in a bowl-shaped body having air apertures to admit air to the interior and with a top grill plate for supporting pans or other receptacles, the plate being at a fixed location in one form of the invention and being capable of height adjustment with respect to the candle in another embodiment.

The food heating devices referred to above lack the simplicity of construction of the heater of the present invention, do not provide comparable adjustability of the heating element with respect to the receptacle to be heated, do not have handles for movement of the heater to any desired location without likelihood of burning the fingers, and lack the attractiveness of appearance of the present heater.

SUMMARY OF THE INVENTION

In accordance with the invention, a heater for butter and the like is provided which comprises a tubular cylindrical housing of sheet metal with the top flared for the reception and retention of a cup-shaped receptacle whose contents are to be heated, in which the housing is elevated on and supported by a plurality of strips secured to the housing, whose lower ends extend outwardly and provide feet and whose upper ends extend outwardly and provide handles, the housing having air inlet and gas outlet openings in the side walls and a vertically movable candle carrying heater support with a base or shelf portion and an upwardly extending arm carrying a threaded stud movable in a vertical slot and held at the desired elevation to position the candle by an externally accessible and manually actuable nut. The heating receptacle can be readily removed and replaced as desired.

BRIEF DESCRIPTION OF THE DRAWING

The nature and characteristic features of the invention will be more readily understood from the following description taken in connection with the accompanying drawings forming part hereof, in which.

Figure 1:
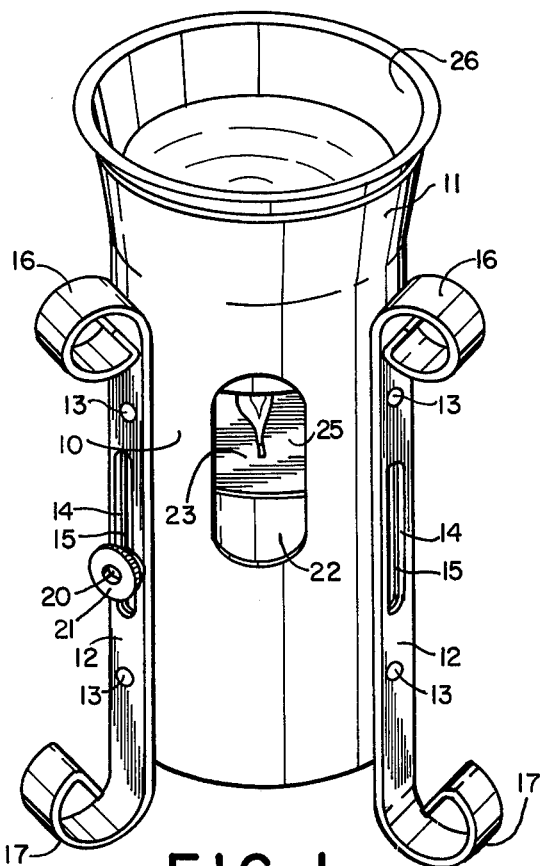
FIG. 1 is a view in perspective of a heater in accordance with the invention.
Figure 2:
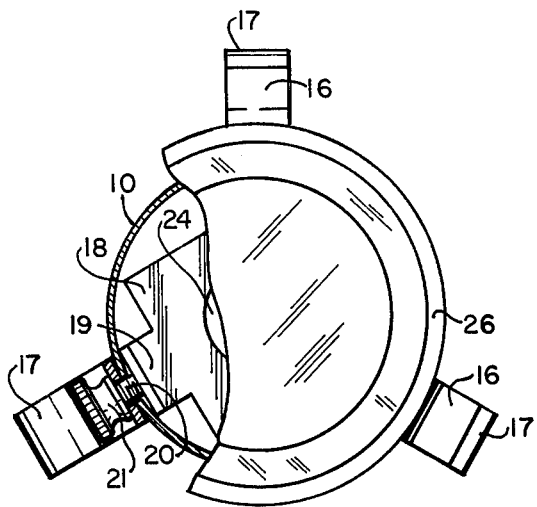
FIG. 2 is a top plan view of the heater shown in FIG. 1, parts being broken away to show the details of construction.
Figure 3:
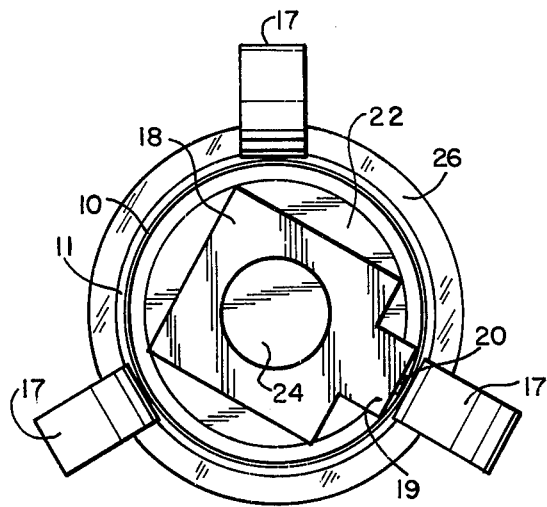
FIG. 3 is a bottom plan view of the heater shown in FIG. 1.
Figure 5:
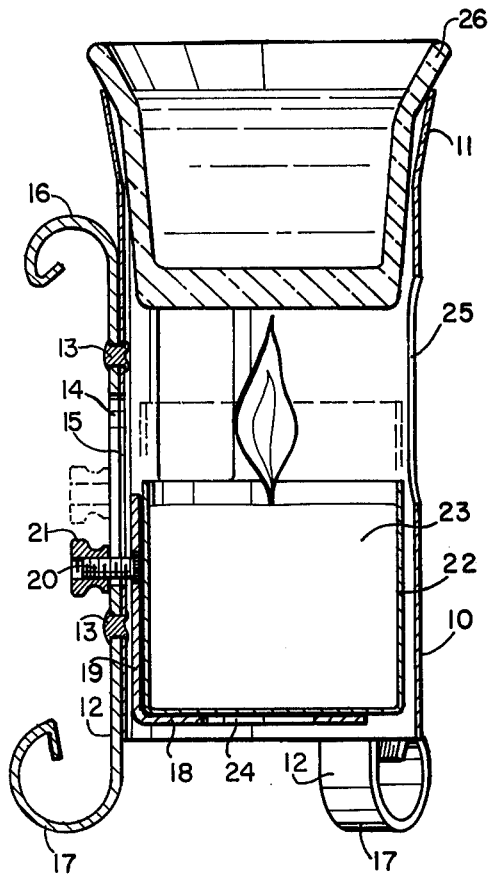
FIG. 5 is a vertical sectional view taken approximately on the line 5—5 of FIG. 4.
Figure 4:
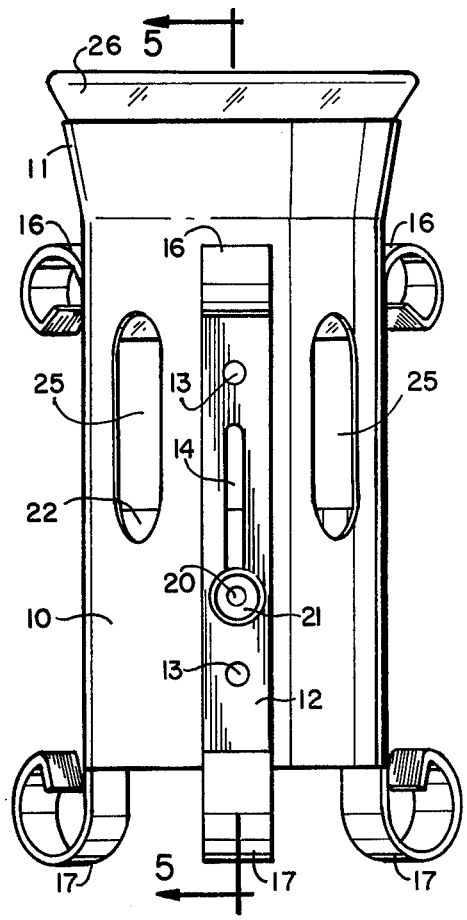
FIG. 4 is a view in side elevation of the heater shown in FIG. 1.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF A PREFERRED EMBODIMENT

Referring now more particularly to the drawings, a cylindrical housing 10 is provided, with its wall, preferably of sheet metal, and with an upper flared or frustoconical portion 11. The housing 10 has its central longitudinal axis vertically disposed. At a plurality of locations around the exterior of the housing 10, strips 12, three being shown, are secured to the housing 10, such as by rivets 13.

Each of the strips 12, between the rivets 13 has a vertical slot 14 with an aligned slot 15 in the wall of the housing 10.

The upper end of each strip 12 is curled outwardly and then upwardly to provide a handle 16 for engagement by the thumb and first finger of the user, the handles 16 being readily accessible from the exterior.

The lower end of each strip 12 extends downwardly below the lower end of the housing 10 and is then curled outwardly and then downwardly to provide supporting feet 17 to provide stability and to support the housing 10 elevated from the table or other support on which the heater is used.

Within the interior of the housing 10 a vertical shelf 18 is provided, preferably rectangular in shape, to provide access for air to pass upwardly within the housing 10.

The shelf 18 has a vertical mounting bracket 19 extending upwardly therefrom from which a vertical threaded stud 20 extends outwardly through one of the pairs of openings 15 and 14. A thumb nut 21 on the stud 20 can be tightened to retain the shelf 18 at the desired vertical location.

A candle retainer cup 22 is provided, carried on the shelf 18, for the reception of a candle 23 to provide a heat source. The shelf 18 can be provided with a central opening 24 to facilitate separation of the cup 22 for the shelf 18 for candle replacement when desired. It will be noted that a clearance space is provided between the exterior of the cup 22 and the interior of the housing 10 for upward movement of air entering below the shelf 18.

The housing 10 is also provided with a plurality of vertical openings 25 for air inlet and gas outlet which preferably extend above the upper rim of the cup 22 when it is in its uppermost position to permit air to enter to support combustion of the candle 23 and to permit gas exit.

A cup-shaped receptacle 26, preferably with a flaring side wall, is provided to receive the material to be heated, such as butter or the like, and while shown as of glass could be of metallic foil or other desired material. The receptacle 26 is of a size such that it can be inserted in the upper end 11 of the housing 10 and will be retained therein by its weight and the weight of its contents.

In use the material to be heated is placed in the receptacle 26, the candle 23 is lighted, and the receptacle 26 is inserted in the upper end 11 of the housing 10.

The candle 23 can then be positioned at the desired height to heat the contents of the receptacle 26 and locked in the adjusted position by the nut 21. After initial heating of the contents of the receptacle 26, the candle 23 can be lowered to provide continuous heating at a lower level than that initially required for melting and to bring the contents of the receptacle 26 to the temperature level desired.

I claim:

1. A heater for a receptacle whose contents are to be heated comprising
    a hollow vertical cylindrical housing having a wall with a flaring upper wall portion for the support thereon of the receptacle and a lower wall portion,
    a plurality of vertical strips secured to said housing wall and having lower leg portions extending below and outwardly with respect to the lower portion of said housing wall and at least one of said strips having a handle means extending outwardly from its upper end and contiguous to said upper wall portion,
    a shelf within said housing having a mounting bracket secured thereto,
    a heating member supported on said shelf, and members for controlling the positioning of said shelf comprising
        a threaded stud carried by said mounting bracking and extending through an upwardly extending slot in said housing wall, and
        a nut on said stud for clamping said shelf at a desired position of vertical adjustment.

2. A heater as defined in claim 1 in which
    each of said strips has a handle means extending outwardly from its upper end and contiguous to said upper wall portion, p1 one of said strips has an upwardly extending slot aligned with the slot in said housing wall,
    said threaded stud extends through both said slots,
    said nut is in clamping engagement with said one of said strips,
    said housing wall has a plurality of openings for access of air to the interior of said housing, and
    said shelf has a candle cup carried thereon in spaced relation to the interior of the housing wall.

3. A heater as defined in claim 1 in which
    at least one of said strips has a vertical slot through which said stud extends.

4. A heater as defined in claim 1 in which
    said housing wall has a plurality of openings for access of air to the interior of said housing.

5. A heater as defined in claim 1 in which
    said shelf has a candle cup carried thereon in spaced relation to the interior of the housing wall.

* * * * *

UNITED STATES PATENT OFFICE
CERTIFICATE OF CORRECTION

Patent No. 4,102,323                    Dated July 25, 1978

Inventor(s) Peter G. Pritz

It is certified that error appears in the above-identified patent and that said Letters Patent are hereby corrected as shown below:

Column 4, line 16, after "portion" delete "pl"

Signed and Sealed this

Twenty-third Day of January 1979

[SEAL]

Attest:

RUTH C. MASON
*Attesting Officer*

DONALD W. BANNER
*Commissioner of Patents and Trademarks*